United States Patent Office 3,362,873
Patented Jan. 9, 1968

3,362,873
FUNGICIDAL COMPOSITIONS CONTAINING MANGANESE ETHYLENE BIS-DITHIOCARBAMATES AND AN AMINOACETIC ACID DERIVATIVE AND METHOD OF USING SAME
Richard N. Knowles, Hockessin, Del., assignor to E. I. du Pont de Nemours and Company, Wilmington, Del., a corporation of Delaware
No Drawing. Filed Apr. 7, 1966, Ser. No. 540,816
7 Claims. (Cl. 167—38)

This application is a continuation-in-part of my copending application Ser. No. 259,432, filed Feb. 18, 1963, now abandoned.

This invention relates to a fungicidal composition. More specifically, this invention refers to a fungicidal composition comprising manganous etheylene bisdithiocarbamate and an aminoacetic acid derivative, such as the tetrasodium salt of ethylenedinitrilotetraacetic acid, the sodium salts of nitrilotriacetic acid, the trisodium salt of N-(carboxymethyl) - N' - (2 - hydroxyethyl) - N,N' - ethylenediglycine and the trisodium salt of N-(carboxymethyl)-N,N'-ethylenediglycine.

The fungicidal mixtures of this invention possess new and unobvious properties not predictable from the individual activities of the ingredient compounds. The surprising effect of this mixture is that the ingredient compounds enhance the effect of each other. Thus, I have found that the composition of this invention is much more fungicidally active than would be expected on the basis of the additivity of the two ingredients taken individually. The novel mixture of this invention is made by admixing one to eighty-three parts by weight of manganese ethylene bisdithiocarbamate with one part by weight of an aminoacetic acid derivative.

Use

The mixture of this invention possesses outstanding broad spectrum fungicidal activity and exhibits no apparent phytotoxicity when applied to the soil or to seeds at fungicidal concentrations. Hard-to-kill fungi which are particularly well controlled by the compounds of this invention are Pythium spp., and Fusarium spp. The mixture of this invention can also be used to control such turf diseases as dollar spot caused by *Sclerotinia homoeocarpa*, brown patch caused by *Pellicularia filamentosa*, snow mold caused by *Fusarium nivali*, copper spot caused by *Gloeocercospora sorghi* and blight caused by Helminthosporium spp.

Compositions

Fungicidal compositions of this invention can contain one or more surface-active agents. The surfactant or "surface-active agent" can be any of the anionic, cationic and non-ionic surface-active agents. Suitable surface-active agents are set out, for example, in "Detergents and Emulsifiers," 1964 Annual, by John W. McCutcheon, Inc.

Among the more preferred surfactants are those anionic and non-ionic agents recognized in the art as wetting agents, detergents or emulsifiers. Among the anionic surfactants, preferred ones are alkali metal or amine salts of alkylbenzene sulfonic acids such as dodecylbenzenesulfonic acid, sodium lauryl sulfate, alkylnaphthalene sulfonates, sodium-N-methyl-N-oleoyltaurate, oleic acid ester of sodium isothionate, octyl sodium sulfosuccinate, sodium dodecyldiphenyl oxide disulfonate. Among the non-ionic compounds, the preferred members are alkyl phenoxy poly(ethyleneoxy) ethanols such as nonyl phenol adducts with ethylene oxide; trimethyl nonyl polyethylene glycol esters, polyethylene oxide adducts of fatty and rosin acids, long chain alkyl or mercaptan adducts with ethylene oxide.

Other preferred surface-active materials are anionic and non-ionic dispersing agents such as lignin sulfonates, polymerized alkyl aryl sulfonates, low-molecular weight polyvinyl alcohols and low-molecular weight methyl- or hydroxyethyl celluloses.

Surfactants can be present in compositions in this invention in the range of 0.02 to 20% by weight. However, a ratio of surfactant to active agent of about 0.2 to 10% by weight is preferred.

Compositions can be formulated by adding a free-flowing inert powder to the active agents.

Free-flowing inert powders can be any of the extenders or pulverulent solids commonly employed in the fungicide art. They can include natural clay such as kaolinite, montmorillonite, or attapulgite, diatomaceous earth, talc, synthetic mineral fillers derived from silica and silicates such as synthetic fine silica and synthetic calcium or manganese silicate, wood flour and walnut shell flour.

Particle size of the extender can vary considerably but will ordinarily be under 50 microns in the finished formulation.

In powdered compositions the active compound can be combined with the powder to form pellets or granules. In these compositions the two active compounds ordinarily will be present at the rate of 2 to 95% by weight.

In dust compositions containing free-flowing mist powder and, if desired, one or more surfactants the active compounds ordinarily will be present at the rate of 2 to 50% by weight. The mist powder can be present in amounts of from 50 to 98% by weight of the composition. Dust compositions containing 4–25% active mixture are preferred.

All the active compounds used in this invention can be formulated in a wettable powder mixture containing surfactant, inert powder, and 25 to 95% by weight active ingredients. Preferred compositions contain from 50–90% by weight active ingredients.

Compositions of this invention can additionally contain other fungicides in order to control a broader spectrum of fungi. Illustrative of some of these fungicides are: p-dimethylaminobenzene diazo sodium sulfonate; quinone oxime benzoyl hydrazone; tetraalkyl thiuram disulfides such as tetramethyl thiuram disulfide and tetraethyl thiuram disulfide; metal salts of ethylene bisdithiocarbamic acid, e.g. zinc, iron and sodium salts; pentachloronitro benzene; dodecyl guanidine acetate; N-trichloromethylthio tetrahydrophthalimide; N-trichloromethylthio phthalimide; phenylmercury acetate; ethylmercury acetate; ethylmercury dihydroxypropyl mercaptide, methylmercury acetate, methylmercury dihydroxypropyl mercaptide, 2,4-dichloro - 6 - (p-chloroaniline)triazine; tetrachloronitroanisole; and methylmercuridicyandiamide.

The above fungicides are added to compositions containing manganous ethylene bisdithiocarbamate and the aminoacetic acid derivative at the rate of 1 to 20 pounds to each 10 pounds of a mixture of manganous ethylene bisdithiocarbamate (maneb) and aminoacetic acid derivative sodium salt. Of course, more or less of the above listed fungicides can be added to the composition depending on the fungi present in the area to be protected.

It is also possible, and sometimes desirable, to include in compositions of this invention soil insecticides such as dieldrin, heptachlor, aldrin, endrin, DDT, methoxychlor and the like. When so used, such insecticides are added at the rate of from 1 to 20 pounds per 10 pounds of maneb/aminoacetic acid derivative.

Adjuvants that improve the convenience of application or the performance of the mixture can also be included. Stabilizers such as hexamethylenetetramine or paraformaldehyde can be used, or safeners such as methylcellulose which reduce the phytotoxicity to plants.

Application

The compositions of this invention can be sprayed directly or in formulations on the soil or on seeds.

When applied to the soil compounds of this invention are generally applied before emergence of plants at a broadcast dosage of 20 to 100 pounds of active ingredient per acre to give satisfactory control of fungi. A preferred broadcast dosage because of excellent control of fungi at low cost is 50 to 100 pounds of active ingredients per acre. Best results are obtained by spraying directly on a band approximately 4 inches wide over an acre of open furrows containing seeds. Spray is directed in such a way as to strike the sides of the furrows as well as the bottom of the furrows. The furrow then can be closed and the seeds are fully protected from fungus attack. In-the-row one-half to ten pounds of active ingredient per 12,000 feet of row gives satisfactory control of fungi. A preferred dosage in-the-row because of exceptionally good control of fungi at low cost is 1 to 4 pounds of active ingredients per 12,000 feet of row.

In-the-row treatment is extremely useful in the protection of newly-germinated seedlings of crops such as cucumbers, sugar beets, cotton and the like from such soil-borne fungi as Pythium spp. Soil drench treatment protects tobacco seedlings from the ravages of damping-off organisms by application of compositions of this invention as a soil drench to the seed bed at rates of about 30 to 100 pounds of active ingredients per acre and preferably at the rate of 40 to 60 pounds of active ingredients per acre. The compositions of this invention are also useful when applied as in-the-row treatment at 1 to 8 pounds of active ingredients per acre and preferably at the rate of 2 to 4 pounds of active ingredients per acre in protecting tobacco plants from tobacco black shank caused by *Phytophthora parasitica* var. *nicotianae*.

The compositions of this invention can also be mixed with seeds such as cotton or sugar beet by suitable application at rates of 1 to 16 ounces of active ingredient per cwt. to give control of fungi. It is preferred, because of excellent control of fungi at a low use-cost ratio to use 2 to 8 ounces of active ingredient per cwt. When cotton seeds were treated with compounds within the scope of this invention in the above-described manner, effective protection of the young germinated cotton seedlings was obtained against Pythium spp. A good stand of healthy cotton plants was obtained.

The composition of this invention can be mixed with seeds such as cotton directly in the hopper box from which the seed is planted. For such use the rate of active ingredients is from 0.4 to 8.0 pounds of manganous ethylene bisdithiocarbamate and the appropriate proportionate amount of an aminoacetic acid derivative as described above.

In order that the invention may be better understood, reference should be had to the following illustrative examples. It is understood that all percentages given are by weight unless otherwise specified.

Example 1

| | Percent |
|---|---|
| Manganous ethylene bisdithiocarbamate | 80 |
| Ethylene diamine tetra acetic acid, sodium salt | 4 |
| Crude calcium and sodium lignin sulfonate | 1 |
| Sodium alkylnaphthalene sulfonate | ½ |
| Methylcellulose, 15 cps. grade | 2 |
| Impurities and water of crystallization in manganous ethylene bisdithiocarbamate | 12½ |

The ingredients are mixed and passed through a hammer mill such as a micropulverizer until the mixture is sufficiently fine so that a slurry in water will show excellent suspension stability. For example, the slurry will remain suspended in a 500 ml. graduate cylinder so that after 10 minutes standing only a minor percentage has settled into the lowest 10% of the volume.

The mixture described above is sprayed in the furrow at the rate of 9 pounds per acre row active ingredients (12,000 feet of row per acre). Tobacco seedlings can be planted immediately. These tobacco seedlings are protected against the attack of the black shank fungus, *Phytophthora parasitica* var. *nicotianae*.

Example 2

| | Percent |
|---|---|
| Powder of Example 1 | 12.5 |
| Pentachlorinitrobenzene, 75% wettable powder | 13.3 |
| Gypsum ($CaSO_4 \cdot 2H_2O$) | 24.2 |
| Talc | 50.0 |

The ingredients are mixed and deagglomerated in a shearing device or hammer mill until a uniform dust, as measured by the draw-down test, has been obtained.

Ten pounds of the above formulation is mixed with 100 pounds of cotton seed. Some of the product remains on the seed, and some of the product is sprinkled on the soil during the planting operation. This is known as the "hopper box treatment." Seeds and growing plants are protected against the attack of the fungi Pythium spp. and *Rhizoctonia solani*.

Example 3

| | Percent |
|---|---|
| Manganous ethylene bisdithiocarbamate | 40.0 |
| N-(carboxymethyl) - N' - (2-hydroxyethyl)-N,N'-ethylene diglycine trisodium salt | 2.5 |
| Hydrated attapulgite | 10.0 |
| Gypsum ($CaSO_4 \cdot 2H_2O$) | 25.0 |
| Talc | 22.5 |

Using conventional equipment the chemical is rotovated into the soil treating an area in a band where the seed is to be planted. This is known as an "in-the-row treatment." The rate of active ingredients used is 6.5 pounds per acre row (12,000 feet of row per acre). Green bush bean seed can be planted immediately, and the seed and growing plant are protected from attack of the damping-off fungus Pythium spp.

Example 4

The N-(carboxymethyl)-N'-(2-hydroxyethyl) - N,N'-ethylene diglycine trisodium salt of Example 3 is substituted with a like amount by weight of N-(carboxymethyl)-N,N'-ethylene diglycine, trisodium salt. The ingredients are formulated in like manner and are applied in like fashion. Like results are obtained.

Example 5

The ethylenediamine tetraacetic acid, sodium salt of Example 1 is substituted with a like amount by weight of nitrilotriacetic acid, sodium salt. The ingredients are formulated in like manner and applied in like fashion. Similar results are obtained.

The invention claimed is:
1. A fungicidal composition comprising:
   1 to 83 parts by weight of manganous ethylene bisdithiocarbamate
   for each part by weight of a compound selected from the group consisting of:
   tetrasodium salt of ethylene dinitrilotetraacetic acid,
   trisodium salt of N-(carboxymethyl)-N'-(2-hydroxyethyl)-N,N'-ethylene diglycine,
   trisodium salt of N-(carboxymethyl)-N,N'-ethylene diglycine,
   nitrilotriacetic acid, mono sodium salt,
   nitrilotriacetic acid, disodium salt, and nitrilotriacetic acid trisodium salt.
2. A fungicidal composition comprising:
   2 to 50% by weight of the composition according to claim 1 and
   50 to 98% by weight of a free-flowing inert powder.
3. A fungicidal composition comprising:

2 to 95% by weight of the composition according to claim 1,
0.02 to 20% by weight of a surface-active agent and
5 to 98% by weight of a pulverulent solid.

4. Method of controlling fungi comprising applying to the soil a fungicidally effective amount of a composition comprising:

1 to 83 parts by weight of manganous ethylene bisdithiocarbamate for each part by weight of a compound selected from the group consisting of:

tetrasodium salt of ethylene dinitrilotetraacetic acid,
trisodium salt of N-(carboxymethyl)-N'-(2-hydroxyethyl)-N,N'-ethylene diglycine,
trisodium salt of N-(carboxymethyl)-N,N'-ethylene diglycine,
nitrilotriacetic acid, mono sodium salt,
nitrilotriacetic acid, disodium salt, and nitrilotriacetic acid trisodium salt.

5. Method of controlling fungi comprising applying to the soil a fungicidally effective amount of a composition comprising:

1 to 83 parts by weight of manganous ethylene bisdithiocarbamate for each part by weight of a compound selected from the group consisting of:

tetrasodium salt of ethylene dinitrilotetraacetic acid,
trisodium salt of N-(carboxymethyl)-N'-(2-hydroxyethyl)-N,N'-ethylene diglycine,
trisodium salt of N-(carboxymethyl)-N,N'-ethylene diglycine,
nitrilotriacetic acid, mono sodium salt,
nitrilotriacetic acid, disodium salt, and nitrilotriacetic acid trisodium salt and
0.02 to 20% by weight of a surface-active agent.

6. Method of controlling fungi comprising applying to seed in contact with fungi a fungicidally effective amount of a composition comprising:

1 to 83 parts by weight of manganous ethylene bisdithiocarbamate for each part by weight of a compound selected from the group consisting of:

tetrasodium salt of ethylene dinitrilotetraacetic acid,
trisodium salt of N-(carboxymethyl)-N'-(2-hydroxyethyl)-N,N'-ethylene diglycine,
trisodium salt of N-(carboxymethyl)-N,N'-ethylene diglycine,
nitrilotriacetic acid, mono sodium salt,
nitrilotriacetic acid, disodium salt, and nitrilotriacetic acid trisodium salt.

7. Method of controlling fungi comprising applying to seed in contact with fungi a fungicidally effective amount of a composition comprising:

1 to 83 parts by weight of manganous ethylene bisdithiocarbamate for each part by weight of a compound selected from the group consisting of:

tetrasodium salt of ethylene dinitrilotetraacetic acid,
trisodium salt of N-(carboxymethyl)-N'-(2-hydroxyethyl)-N,N'-ethylene diglycine,
trisodium salt of N-(carboxymethyl)-N,N'-ethylene diglycine,
nitrilotriacetic acid, mono sodium salt,
nitrilotriacetic acid, disodium salt, and nitrilotriacetic acid trisodium salt and
5 to 98% by weight of an inert powder and 0.02 to 20% by weight of a surface-active agent.

References Cited

UNITED STATES PATENTS 2,401,080  5/1946  Kilgore _____ 167—22
3,284,287  11/1966  D'Amico _____ 167—22

ALBERT T. MEYERS, *Primary Examiner.*

DALE R. MAHANAND, *Examiner.*